2,884,340
Patented Apr. 28, 1959

2,884,340

POLYISOCYANATE MODIFIED PLURAL COAT SYSTEM FOR LEATHER

Sam Loshaek, Hatboro, Pa., assignor to Rohm & Haas Company, Philadelphia, Pa., a corporation of Delaware No Drawing. Application January 27, 1955
Serial No. 484,563

14 Claims. (Cl. 117—76)

This invention relates to coated leathers and to processes for producing them. It is particularly concerned with coated leathers having composite multi-layer coatings which have improved adhesion to the leather, excellent softness and flexibility even under extremes of cold and heat, good resistance to loss of pigment on rubbing, and improved surface characteristics in respect to dryness of feel, texture and slipperiness.

In conventional practice plasticized nitrocellulose lacquers are customarily applied as coatings for full-grain and hand-buffed leathers. When sufficient plasticizer is used in such coatings to provide good flexibility even at low temperatures in the range from $-25°$ C. to $10°$ C., however, the coated leathers are characterized by an undesirable sticky surface, and because of the tendency for plasticizer to become lost gradually, the coating on such leathers gradually increases in brittleness and cracks with age. To some extent the nitrocellulose lacquers have been superseded in the coating of hand-buffed leathers by a coating system involving the application of emulsion polymerized acrylate resins as a base coat followed by the application of vinyl resin lacquers. Such products, while giving a finish of greater flexibility often have even more sticky surface characteristics than those obtained with nitrocellulose lacquers and are characterized even at normal temperatures by a "draggy" surface feel, that is one which does not readily slide over other surfaces (including its own surface) against which the coated leather surface is in contact.

These disadvantages are overcome by the processes of the present invention and novel improved coated leathers are thereby obtained. The coated leathers of the present invention comprise a multi-layer coating having improved adhesion to the leather, good softness and flexibility and freedom from draggy or sticky feel on the coated surfaces. Various methods are used for producing the improved coated leathers of the present invention as follows:

A. The simplest system for producing coated leathers having the improved characteristics typical of the present invention involves the use of a two-coat system which may be applied on all types of full-grain and buffed leathers. It is especially useful, however, on the best quality full-grain leathers which require no treatment to fill imperfections and to which there may or may not be applied an embossing operation. This system may be executed in various ways as indicated under the following items (a) to (e) following:

(a) The simplest procedure for producing the two-coat leather involves the application of a base coat from a solution in an organic solvent of a film-forming addition polymer such as of a vinyl or acrylic resin, optionally a plasticizer for the addition polymer when it is not internally plasticized, and an organic polyisocyanate, such as an organic diisocyanate or triisocyanate, in which solution there is dispersed or suspended a pigment. Either or both the film-forming addition polymer and plasticizer may contain groups such as carboxyl (COOH), hydroxyl (OH), mercapto (SH), primary amino ($NH_2$), secondary amino (NHR), tertiary amino as in the pyridyl nitrogen (C=N—C), amide ($CONH_2$), and substituted amide (CONHR), which are reactive with the polyisocyanate. In the NHR and CONHR radicals, R may represent a hydrocarbon radical, such as an alkyl or aryl group, of which methyl, ethyl, isopropyl, cyclohexyl, and phenyl are representative.

As the film-forming addition polymer there may be used one or more homopolymers or copolymers of the following monoethylenically unsaturated compounds: vinyl chloride, vinyl acetate, vinyl propionate, vinylidene chloride, esters and nitriles of acrylic and methacrylic acids such as acrylonitrile, methacrylonitrile, and the alkyl esters of acrylic or methacrylic acid in which the alkyl group may be methyl, ethyl, propyl, isopropyl, butyl, octyl, dodecyl, hexadecyl and octadecyl. Besides the above homopolymers and copolymers, polyvinyl acetals such as polyvinyl acetal itself, polyvinyl butyral or partially hydrolyzed homopolymers and copolymers of vinyl acetate, vinyl propionate or of acrylic and methacrylic esters may be used. Such compounds contain reactive hydroxyl and carboxyl groups. Other polymers containing reactive groups may be used provided the polymers do not contain sufficient thereof to render them insoluble in the organic solvent employed. Such polymers include the copolymers containing up to 50 mole percent of $\beta$-hydroxyethyl vinyl ether, up to 50 mole percent of aminoethyl acrylate, aminoethyl vinyl ether or N-methyl- or N-ethylaminoethyl vinyl ether, or up to 30 mole percent of a vinyl pyridine, such as 2-vinyl pyridine, or 4-vinyl pyridine, or of an amide, such as acrylamide, methacrylamide, N-methyl acrylamide, or of an acid such as acrylic acid, methacrylic acid, itaconic acid, or the like.

Besides the film-forming addition polymer or resin, examples of which are given above, the coating composition contains an organic polyisocyanate and especially the hydrocarbon polyisocyanates including ethylene diisocyanate, trimethylene diisocyanate, tetramethylene diisocyanate, hexamethylene diisocyanate, decamethylene diisocyanate, p-phenylenediisocyanate, m-phenylene diisocyanate, naphthalene diisocyanates, benzene 1:3:5-triisocyanate, toluene-2:4:6-triisocyanate, ethylbenzene-2:4:6-triisocyanate, monochlorobenzene - 2:4:6 - triisocyanate, triphenylmethane-4:4':4''-triisocyanate and diphenyl-2:4:4'-triisocyanate, toluene-2,4-diisocyanate, diphenylmethane-4,4'-diisocyanate, 3,3'-dimethyl - 4,4' - diisocyanato-biphenyl, and 3,3'-dimethoxy-4,4'-diisocyanato-biphenyl. The polyisocyanates have various reactivities, some being much slower than others. For example, diphenylmethane-4,4'-diisocyanate is highly reactive whereas the 3,3'-dimethoxy-4,4'-diisocyanato-biphenyl is relatively slow. To compensate for the difference in reactivity, the proportion added may be increased for the slower ones and decreased for the faster ones or basic catalysts, such as tertiary amines may be included, especially with the slower ones. Mixtures of the polyisocyanates may be used of which a preferred combination is a mixture of toluene-2,4-diisocyanate and either 3,3'-dimethoxy - 4,4' - diisocyanato-biphenyl or 3,3'-dimethyl-4,4'-diisocyanato-biphenyl.

The plasticizer, if used, may be a polyester, polyamide or polyester amide such as may be obtained by the condensation reaction of a dibasic acid with a polyol (that is, a polyhydric aliphatic alcohol or a polyamine. More particularly, the plasticizer which may be termed a "polymeric" plasticizer may be obtained by reacting combinations of materials of the general types noted below:

I. Glycols (or other polyols) and dibasic acids
II. Amino alcohols and dibasic acids
III. Glycols, diamines and dibasic acids IV. Glycols, amino alcohols and dibasic acids
V. Amino alcohols, diamines and dibasic acids
VI. Amino acids, glycols and dibasic acids
VII. Amino acids, amino alcohols and dibasic acids
VIII. Amino alcohols, dibasic acids and hydroxycarboxylic acids It is advantageous to use a small excess of the alcoholic-hydroxyl-containing constituent in preparing the polymers.

Examples of polyols include trimethylol methane and erythritol. Examples of glycols are ethylene glycol, propylene glycol, diethylene glycol, trimethylene glycol, pentamethylene glycol, hexamethylene glycol, decamethylene glycol, dodecamethylene glycol, 1:12-octadecanediol and pentaglycol.

Examples of dibasic carboxylic acids are malonic, succinic, glutaric, adipic, β-methyladipic, pimelic, suberic, azelaic, sebacic, undecanedioic, brassylic, isophthalic, hexahydroterephthalic, p-phenylene-diacetic and acetone-dicarboxylic acid.

Any amino alcohol having at least one hydrogen atom attached to the amino nitrogen atom may be employed including aromatic amino alcohols, e.g. p-hydroxymethylbenzylamine, 4 - hydroxymethyl - 4 - aminomethyldiphenyl and p-aminophenylethyl alcohols; aliphatic amino alcohols, e.g. 5 - aminopentanol - 1:6 - amino - 5 - methylhexanol - 1,4(p - aminophenyl)cyclohexanol, hydroxyethoxyethylamine, and N - (β - aminoethyl) - N-(omega-hydroxy-hexyl)-aniline.

The preferred amino alcohols are of formula

HO—R—NH$_2$ where R represents saturated divalent hydrocarbon radicals with a chain length of at least two carbon atoms. Amino alcohols which fall within this group include ethanolamine, 3 - aminopropanol, 4 - aminobutanol, 6-aminohexanol, and 10-aminodecanol.

Any diamine may be employed, which contains at least one hydrogen atom attached to each amino nitrogen atom. The preferred diamines are of formula NH$_2$RNH$_2$ where R represents saturated divalent hydrocarbon radicals with a chain length of at least two carbon atoms, e.g., ethylenediamine, hexamethylenediamine, 3-methylhexamethylenediamine, and decamethylenediamine. However, aromatic diamines such as m-phenylenediamine may also be used.

Any polymerizable monohydroxy monocarboxylic acid or ester-forming derivative thereof may be employed. The preferred hydroxy-acids are of formula HO—R—COOH where R represents saturated divalent hydrocarbon radicals, e.g., 6-hydroxycaproic, 10-hydroxydecanoic, and 12-hydroxystearic acid.

Any polymerizable monoaminomonocarboxylic acid or ester-forming derivative thereof may be employed including 6-aminocaproic, 9-aminononanoic, and 11-aminoundecanoic, and 12-aminostearic acids, caprolactam, etc.

Any suitable pigment may be employed, depending on the color desired, including red iron oxide, chrome green, molybdate chrome orange, phthalocyanines, such as copper phthalocyanine, titanium dioxide, lithopone, chrome yellow, ultramarine blue, red cadmium, yellow cadmium, organic toners and lakes, and so on.

The organic solvents that may be used include ketones such as acetone, methyl ethyl ketone and dioxane; hydrocarbons such as xylene, toluene, benzene as well as paraffinic or naphthenic types such as solvent naphthas, esters such as ethyl, propyl, butyl and amyl acetate as well as ethoxyethyl acetate, butoxyethyl acetate and the like, or ethers such as butyl ethyl ether. The solvent may comprise a mixture of several types but in any case, the solvent should be of a type which does not contain an active hydrogen.

Besides the above essential ingredients, the composition may contain auxiliary ingredients added for specific purposes for special instances. For example, a lubricant such as paraffin waxes or mineral oil may be included in a small amount of about ½ to 1% by weight of the solution to act as a mold release agent if the leather is to be subjected to embossing after the application of any particular coating. Stabilizers for any particular component of the composition may be included. Thus, tertiary amines may be employed with certain vinyl chloride polymers to stabilize the composition. In some instances, it may be desirable to incorporate an accelerator or catalyst for hastening the reaction of the polyisocyanate with the leather or with the plasticizer or film-forming addition polymer within the coating composition itself. The amount of such an accelerator may be from 1% to 5% by weight of the polyisocyanate used and as such an accelerator tertiary amines are especially valuable such as trialkylamines, dimethylpiperazine, dimethylaminocyclohexane (hexahydrodimethylaniline), perhydroethylcarbazol, methyl or butylpyrrolidine and its homologues, quinoline and its homologues. The action of the tertiary amines depends upon their basic character. Triethylamine exhibits the strongest action, while quinoline has the least influence on the speed of the reaction. Such a catalyst may be added to the composition just before use unless a polyisocyanate of unusually low reactivity is used, in which case the accelerator may be incorporated without excessively diminishing the storage life of the composition in case it is not to be used immediately after such addition.

For the colored base coat thus generally described, the various components may be present in the following proportions. From 20 to 100 parts by weight of plasticizer may be present per 100 parts of the addition polymer; from 5 to 100 parts by weight of a pigment or mixture of pigments per 100 parts of the addition polymer may be present; from 1% to 65% by weight of a polyisocyanate based on the sum of the weights of the plasticizer and addition polymer may be present. The amount of solvent employed may be such as to provide a solids concentration (that is materials other than the solvents themselves) of 2% to 20% by weight. The coating composition may be applied to the leather in any suitable manner by any known coating equipment such as by brush, roller coating or spraying. The coating is dried such as at normal room temperature or at somewhat elevated temperatures of 40° to 100° C. for a period of time, the length of which is inversely proportional to the degree of temperature. For example, a period of ten seconds may be adequate at 100° C. whereas a period of an hour or more may be desirable at 40° C. Preferably temperatures in the lower part of the range specified are employed such as at around 50° C., but in any event the time and temperature of drying are so correlated as to avoid completely reacting the polyisocyanate in the composition.

There is then applied a second and final coat by means of an unpigmented solution (either clear or containing an inert filler to provide a dulled appearance) of the film-forming resin with a plasticizer therefor, either or both of which may be the same as or different from the plasticizer and film-forming resin of the first coat. In this coating any of the plasticizers and addition polymers mentioned hereinabove may be used. When both coatings contain an external plasticizer, the proportion thereof in the second and final coating composition is generally, though not necessarily, somewhat less in proportion to the addition polymer than the proportion used in the first coating. Generally it is within the proportion of 15 to 80 parts per 100 parts of the addition polymer. Similarly, the solvents may be the same or different and the solids concentration in the solution applied may be the same as that used for the first coating which may be termed a color coat or it may be widely different therefrom.

After the final coat is applied, drying is effected and it may be carried out under any of the conditions mentioned hereinabove for the drying of the first coat either in the same specific manner in any particular case or under different conditions if desired.

If embossing is desired, either in the coating of a full-grain or a buffed leather, it is preferred that the embossing operation be performed between the drying of the first coat and the application of the second coat.

The final coat should be applied before the isocyanate applied in the first coat has been completely reacted. It appears that when the first coat is dried under the conditions mentioned above, the polyisocyanate still retains a portion of its reactivity even for a period as long as several days to a week after the drying of the first coat. However, to assure that this residual reactivity is not lost before the second coat is applied, it is preferred that the second coat be applied within 24 hours of the application of the first coat, especially when the coating operation is performed during hot weather or the preliminarily coated leather is stored or must be stored under conditions of high humidity and temperature. The application of the top coat under these conditions apparently results in the polyisocyanate having a pronounced effect upon the top coat and especially its surface characteristics. While it is not desired to be limited to any particular theory, it is believed that the production of the dry, slick, non-draggy feel on the surface of the coated leather products of the present invention is caused by some reaction of the polyisocyanate introduced by way of the base coat with either the plasticizer or film-former or both applied in the top coat. The multi-layer coating produced in accordance with the invention has excellent adhesion to the leather and this is believed to be the result of some reaction between the leather, the polyisocyanate, and possibly either the plasticizer or film-former in the first coating composition or both of such materials therein. The coating retains softness and flexibility and resists cracking over prolonged periods of ageing. This retention of flexibility in conjunction with the production of a dry, slippery feel in the surface is an unexpected and surprising result in view of the absence of a polyisocyanate from the second coating composition. The adhesion obtained between the multi-layer coating of the present invention and the leather is adequate to permit wet molding (that is, forming or shaping while in water-soaked condition) of the leather when it is to be used as case leather or upholstery leather. Of course, this high degree of adhesion is also advantageous in other types of leather, such as garment leather and glove leather.

(b) In this modification the advantages sought are to provide separate compositions adapted to be stored for long periods of time, such as several weeks before use. The introduction of a polyisocyanate into a coating composition as in part (a) above reduces the stability of such composition, especially when it contains pigments. It appears that even though the polyisocyanate may be quite slow in reacting with the plasticizer or film-forming component of the composition so that such composition would remain as a fairly stable solution without signs of gelling for several weeks, when such a polyisocyanate is added to a composition of the same type but containing a pigment, the pigment settles out in a short period of time in many cases, such as within as short a period as an hour in the most difficult cases and frequently in less than 24 hours. To overcome this disadvantage, the present modification provides two or three master solutions or dispersions or component solutions or dispersions adapted to complement each other so that when mixed, just before use, they provide the appropriate proportions of the several ingredients including the film-forming addition polymer, the plasticizer, the polyisocyanate, pigment and solvents. One component solution may contain part or all of the plasticizer and all of the polyisocyanate dissolved in the selected solvent or solvent mixture. For example, this component solution may contain from ⅕ to ½ of the amount of plasticizer finally desired in the coating composition and all of the polyisocyanate in approximately the smallest amount of solvent needed to dissolve these two materials although additional solvent may be employed if desired. It has been found that the lower the proportion of plasticizer to the polyisocyanate the more stable this component solution becomes. It appears that the polyisocyanate reacts with the available reactive groups in the plasticizer in such a manner as to produce, when the polyisocyanate is present in excess, a condensate having isocyanate groups predominating among the reactive groups, thereby imparting reasonable stability to the solution. A second component dispersion may then be made up containing all of the film-forming resin, the remainder of the plasticizer if any, and the pigment, in the remaining portion of solvent needed. These two component dispersions may be stored for considerable periods of time and yet are easily mixed just before they are needed for use.

A modification of this system may involve the combination of three or more component dispersions to produce the coating composition ultimately desired for application. In such a modification, one component may be the same as the first one mentioned above containing at least a portion of the plasticizer and all of the polyisocyanate. A second component dispersion may comprise a suspension of the pigment in a solution of a portion of the film-forming resin and either the remainder of the plasticizer or an additional portion thereof in a part of the solvent. These two component dispersions may then be used in conjunction with a third solution in the solvent, of a film-forming resin without additional plasticizer or with a predetermined portion thereof. As pointed out, the several component dispersions are reasonably stable and can be stored within the limits of their stability before use. At the same time, they are readily mixed at the time of use.

The base coat containing color obtained by the application of a mixture of the two or more separate component dispersions is dried in the same manner as specified above in part (a) and the same final clear or dulled coat is applied as is described in procedure (a) before the polyisocyanate in the first coat is completely reacted as described in procedure (a).

An unexpected advantage of this system is an improved adhesion as compared to that which may be obtained by procedure (a) hereinabove using a given proportion of polyisocyanate relative to the amounts of film-forming resin and plasticizer. Generally, it has been found that improved adhesion is obtained when the polyisocyanate is preliminarily reacted with the plasticizer before it is introduced into the coating composition containing the film-forming resin. The properties of the coated leather obtained by this procedure are essentially the same as those obtained by procedure (a) except for the better adhesion obtained when the polyisocyanate is preliminarily reacted with the plasticizer as just pointed out.

When the polyisocyanate is to be pre-reacted with either the plasticizer or the film-forming resin (when a reactive type of such resin is used) in order to get improved adhesion or in some cases as pointed out above to obtain better stability in the coating solutions or compositions, the reaction may be effected under a variety of conditions. For example, the plasticizer or the reactive resin may be fused or it may be dissolved in a solvent which is to form a part of the final composition. Then the polyisocyanate is introduced and may be allowed to react at room temperature, preferably with stirring and under a nitrogen atmosphere. Such reaction at room temperature may be allowed to proceed for 24 to 48 hours and if a relatively slow-reacting polyisocyanate is used, a base catalyst such as a tertiary amine may be introduced to accelerate it. If desired, elevated temperatures may be employed up to 120° to 130° C. or even as high as 190° C. or more provided the temperature is below the decomposition temperature of the particular plasticizer or resin and not above the boiling point of any solvent used. At the higher temperatures the time of reaction may be as short as ten minutes. Instead of dissolving the plasticizer in a solvent and then introducing the polyisocyanate, the polyisocyanate may be dissolved in the solvent and the plasticizer or reactive resin or a mixture thereof may be introduced, preferably gradually into the polyisocyanate solution so that excess polyisocyanate is present throughout most or all of the reaction period either in the presence or absence of a base catalyst, such as a tertiary amine, again preferably with stirring and under an inert atmosphere such as nitrogen. In all cases, it is preferred to avoid temperatures above 60° C. to reduce the possibility of cross-linking during the preliminary reaction which may occur between any reactive hydrogen on the groups produced by the initial reaction of the isocyanate group with the reactive groups of the plasticizer or resin, such as the reactive hydrogen on urethane groups produced from hydroxyl groups. This cross-linking reaction is favored by high temperatures and base catalyst. Such preliminary reaction may often be effected with polymers which normally are not considered to contain hydroxyl groups. Such polymers include the homopolymers and copolymers of such esters as vinyl acetate, vinyl propionate and methyl acrylate. For example, copolymers containing 80% to 90% of vinyl chloride and 5% to 20% of vinyl acetate are normally thought of as being free of hydroxyl groups. Apparently, however, such copolymers may, and generally do, contain a small amount of hydroxyl, such as twenty hydroxyl groups per polymer molecule, in a copolymer containing 87% vinyl chloride and having a number average molecular weight of 40,000 to 50,000. Such polymers are, therefore, adapted to be pre-reacted with the polyisocyanate as described above.

(c) Another modification involves the provision of two or more separate component dispersions which are brought together in a spraying system, such as by the provision of two or more separate feed pipes connected with suitable containers for the component dispersions in place of a single liquid feed pipe normally used in a spray gun or other spray systems. One such coponent solution comprises all of the polyisocyanate with a portion, such as one-half of the entire amount, of film-forming resin and at least a portion of the plasticizer, and about one-half the solvent. In this component solution, the plasticizer or film-forming polymer (if it contains reactive groups) or both may be pre-reacted with the polyisocyanate before they are introduced. Alternatively, the plasticizer and/or the film-forming resin may be reacted with a monoisocyanate. As a third alternative one of the plasticizer and addition polymer may be reacted with the polyisocyanate and the other may be reacted with a monoisocyanate. Such a monoisocyanate may be phenyl isocyanate, a toluene monoisocyanate, ethyl isocyanate, hexyl isocyanate, and naphthyl isocyanate or the like. This reaction with a monoisocyanate may be effected in the following manner: The plasticizer or reactive resin is dissolved in a solvent, such as any of the organic solvents mentioned above, which solvent is to be part of the final composition. Then the monoisocyanate is added while stirring the batch under nitrogen atmosphere. The temperature may vary from room temperature, at which it may be allowed to proceed for 24 to 48 hours or it may be at elevated temperatures such as up to 40° to 60° C. At 40° C. the reaction may be allowed to proceed anywhere from three to four hours to fifteen or twenty hours. The proportion of monoisocyanate is preferably that equivalent to the reactive groups in the plasticizer or in the polymer. However, somewhat less or a considerable excess may be used but it is preferred not to use an excess.

The other component dispersion, when two are used as is the preferred situation, contains the remainder of solvent and about one-half of the film-forming resin dissolved therein and sufficient pigment suspended therein to provide the ultimate concentration of color. The two component solutions are preferably made up with such proportions of the solvent and other components that the mixture of equal parts by volume of the two dispersions will provide the concentrations desired of the various components in the final coating. However, the supply pipes in the double spray or multi-spray system may be provided with flow control devices, such as valves, to assure that the proper volume (whether equal or not) of each component solution or dispersion is mixed at the point of spraying. The use of such control devices is necessary when the component dispersions comprise, on the one hand, a simple solution of the polyisocyanate in a part of a solvent and, on the other hand, a suspension of the pigment in a solution of the plasticizer and film-forming resin in the remainder of the solvent. In such a two component system, it is generally desirable that the polyisocyanate solution be fed at a much lower rate to the point of spray-formation in the nozzle than the color suspension.

As in procedures (a) and (b) hereinabove, the sprayed coat obtained from such a multi-component spray system is dried as before and a final clear or dulled top coat of the type described in procedure (a) is applied, and the system is again dried. As in the preceding procedures, the top coat is applied before the polyisocyanate has undergone complete reaction. The quality of the coated product is similar to the products of procedures (a) and (b) and has the aforesaid improved adhesion when the polyisocyanate is pre-reacted with the plasticizer or with the film-forming polymer before it is introduced into its respective component solution.

(d) Another modification involves the swabbing or spraying of the leather with a solution of the polyisocyanate, the application of a base coat corresponding to the base coat described in procedure (a) except for the omission of the polyisocyanate therefrom, the drying as in procedure (a), the application of a top coat as in procedure (a) and the drying thereof as before. Again the top coat is a clear or dulled top coat, which is applied before the polyisocyanate has completely reacted with other components in the system. Surprisingly, even this procedure has been found to reduce the draggy feel that would otherwise be obtained from the application of plasticized addition polymers of the type described hereinabove without a polyisocyanate. While there is good adhesion between the coating and the leather in this system, the surface feel is not quite as slippery or dry as is obtained by procedures (a) through (c) respectively.

(e) In another modification, a base coat containing pigment and having the composition of the base coat of procedure (a) hereinabove except for the omission of the polyisocyanate is first applied to the leather, dried and a top coat of the same composition as described in procedure (a) is applied and dried, and then a polyisocyanate solution is sprayed upon the coated leather. Surprisingly, there is improved adhesion between the leather and the coated system as compared to a coated leather obtained without the final spraying of a polyisocyanate thereon, though the improvement in adhesion is not as pronounced as is obtained by procedures (a) to (d) above. This procedure, however, results in a coated leather having a slick, dry feel, surprisingly without excessive reduction in flexibility.

B. An alternative system is a three-coat system in which a solution containing a film-forming resin, a polyisocyanate, and optionally a plasticizer is first applied as a base coat to the leather. This solution may be in an organic solvent or mixture thereof of the types mentioned hereinabove in procedure (a) and the proportions between the resin, plasticizer (when used) and polyisocyanate may be the same as for the base coat described in procedure (a). If desired, the plasticizer and polyisocyanate may first be reacted and then introduced into the organic solvent solution of the film-forming resin to make the base coating composition. After this composition is applied in any suitable manner, such as brushing, roller coating or spraying, it is dried as in procedure (a) and before the polyisocyanate has been completely reacted, a colored coating composition may be applied. This composition may be the same in make-up as that used for the base coat in procedure (a) except that no polyisocyanate is included. After drying this coat as in (a), a clear or dulled top coat is applied. This top coat may be the same as defined in procedure (a) and is then dried as in (a).

This procedure is not quite as desirable as the procedures of parts (a) and (b) in respect to slickness of surface. Surprisingly, it is not quite as good as procedures (a) and (b) in respect to adhesion when a given polyisocyanate at the same predetermined proportion is used in the respective procedures. Procedures (a) and (b) are preferred when it is desired or necessary that the leather be subjected to wet molding after coating such as in the finishing of case or upholstery leather. One advantage of this procedure as compared to procedure (a) is that there is no pigment in the coating composition containing the polyisocyanate. Since there is no pigment in this composition, it has a stability of such character as will permit it to be used within three days to a week from the time of its initial make-up depending upon the reactivity of the particular polyisocyanate therein. This solution containing the plasticizer, resin and polyisocyanate, but no color, may have imparted to it considerably increased stability so that it may be used up to two weeks or more after being made up by pre-reacting the resin or the plasticizer or both when they contain reactive groups with a monoisocyanate, such as phenyl isocyanate, etc., in the manner pointed out hereinabove.

C. Another system involving a three-layer coating is preferred when full-grain leathers requiring the filling of imperfections or when hand-buffed leathers are desired to be finished. In this system aqueous dispersions of homopolymers or copolymers of the monoethylenically unsaturated compounds mentioned hereinabove (for making the film-forming resins) are first applied to the leather as by spraying, brushing and swabbing. Such aqueous dispersions may be obtained by the emulsion polymerization or copolymerization of the unsaturated compounds mentioned in conventional manner.

Among the dispersed polymers that may be obtained by the emulsion system which are extremely useful in the present invention are those of vinyl acetate or vinyl propionate and copolymers of vinyl acetate with ethyl acrylate, methyl acrylate and so on, homopolymers of methyl acrylate, ethyl acrylate, ethyl methacrylate, methyl methacrylate, butyl methacrylate, hexyl, octyl and lauryl acrylates and methacrylates, and copolymers of 10% to 75% by weight of acrylonitrile with 25% to 90% by weight of methyl acrylate, ethyl acrylate, butyl acrylate, methyl methacrylate or mixtures thereof or with other acrylic or methacrylic esters. There may also be used copolymers of monomers containing reactive groups, such as those mentioned under procedure (a) above. The aqueous polymer dispersion may contain a pigment, if desired.

After applying such a base coating to the leather, it is dried by a suitable procedure such as by merely drying in the ambient air or by the system described in procedure (a) hereinabove. After this coating is dried, the coated leather may be embossed and then one of the two-coat systems described in any of procedures (a) to (c) inclusive is superimposed on the base coat whether embossed or not.

In this system, it has been found that the time of drying the coat containing the polyisocyanate is more limited than in procedures (a) to (c) above. After spraying the color coat containing the polyisocyanate on the base coat, drying may be effected at 50° C. for as long as three hours and preferably no longer than two hours to assure sufficient reactivity remaining in the polyisocyanate to react with the final clear or dulled top coat applied as in procedure (a). By restricting the time of drying to this extent, the coated leather obtained is of anti-blocking character even at 80° C. under a pressure of one pound per square inch.

In the following examples, which are illustrative of the invention, the parts are by weight unless otherwise indicated.

*Example 1*

(a) A mixture of 40 parts of iron oxide ($Fe_2O_3$), six parts of a plasticizer consisting of a polyester obtained by the reaction of sebacic acid with an excess of propylene glycol and having a number average molecular weight of about 4,000, 2.9 parts by weight of a copolymer of 90% vinyl chloride and 10% vinyl acetate having a number average molecular weight of about 40,000, 6.1 parts of ethoxyethyl acetate, 25 parts of methyl ethyl ketone and 20 parts of a petroleum solvent consisting of a mixture of aromatic, naphthenic and aliphatic hydrocarbons is ground in a ball mill for 24 hours to form a pigment dispersion.

(b) A solution is also formed from 3.1 parts of the same plasticizer as above, 5.0 parts of the same vinyl copolymer and 3.0 parts of toluene-2,4-diisocyanate in 10 parts of ethoxyethyl acetate, 44 parts of methyl ethyl ketone and 34.9 parts of a hydrocarbon solvent largely consisting of xylol.

(c) The solution of part (b) is then mixed with the milled pigment dispersion of part (a) in the ratio of 90 parts of the former to 10 parts of the latter. The resultant dispersion is sprayed onto a full-grain upholstery leather and dried at 50° C. for about three hours.

(d) Then a clear coating is applied by spraying a solution containing about 1.5% of the same plasticizer and 5% of the same vinyl copolymer in a solvent mixture composed of 10% of ethoxyethyl acetate, 55% methyl ethyl ketone and 35% of a hydrocarbon composed largely of xylene. After applying the clear coating by spraying, it was dried at 50° C. The final coated leather had a glossy color, was soft and flexible but free of any draggy feel. The adhesion between the finish and the leather was excellent and adapted to withstand wet molding operations.

(e) The procedure of parts (a) to (d) inclusive is repeated, substituting 6 parts of 3,3'-dimethyl-4,4'-diisocyanatobiphenyl for the toluene-diisocyanate.

*Example 2*

(a) A pigment dispersion was made as in Example 1(a) except that (1) the vinyl copolymer was raised to 3.5 parts by weight, (2) the iron oxide was replaced with 40 parts of molybdate chrome orange, and (3) the solvent consisted of 10 parts of ethoxyethyl acetate, 25 parts of methyl ethyl ketone, and 15.5 parts of the petroleum solvent. After the ball milling to form this dispersion, it was mixed with the solution of Example 1(b) in the proportion of ten parts by weight of the pigment dispersion to 90 parts by weight of the solution. The procedure of Example 1(c) and (d) was followed in all other respects and the coated leather was similar except for the tangerine color.

(b) The procedure of part (a) hereof is repeated, replacing the toluene-diisocyanate with 7 parts of 3,3'-dimethoxy-4,4'-diisocyanato-biphenyl.

Example 3

(a) The procedure of Example 1 was followed except that the iron oxide was completely replaced with 6 parts of copper phthalocyanine, the mixed solvent used to form the initial pigment dispersion being correspondingly increased to bring the total composition to 100 parts. The product was similar to that of Example 1 except that it had a blue color.

(b) The procedure of part (a) hereof is repeated, replacing the toluene-diisocyanate with a mixture of 2 parts of the toluene-2,4-diisocyanate and 4 parts of 3,3'-dimethoxy-4,4'-diisocyanato-biphenyl.

Example 4

(a) Place a mixture of 15 parts of toluene-2,4-diisocyanate and 15 parts of methyl ethyl ketone into a pot and heat to 60° C. While stirring this hot mixture add slowly a solution of 15.5 parts of the plasticizer described in Example 1(a) and 15.5 parts of methyl ethyl ketone. After all the latter solution has been added, maintain the pot at 60° C. with continued stirring for 15 to 20 hours. This mixture is allowed to cool and 39 parts of methyl ethyl ketone is added. The above amount of toluene-2,4-diisocyanate amounts to about a 13-fold excess of isocyanate groups over reactive groups in the plasticizer.

(b) Twenty parts of the solution of part (a) hereof are added to a solution containing 7 parts of the vinyl copolymer described in Example 1(a) above, 35 parts of methyl ethyl ketone, 45 parts of xylene and 13 parts of ethoxyethyl acetate. This mixture is mixed with 10 parts of the pigment suspension produced in Example 1(a). The procedure of Example 1(c) and (d) was followed in all other respects and the coated leather was similar.

(c) The procedure of parts (a) and (b) hereof is repeated except the plasticizer was replaced with a corresponding amount of polyamide obtained from the reaction of an excess of trimethylenediamine with succinic acid until a number average molecular weight of 3,000 was obtained. The finished leather was similar to that obtained from part (b) hereof.

(d) The procedure of parts (a) and (b) hereof is repeated replacing the copolymer there used with corresponding amounts of a copolymer of 60% of styrene and 40% of butyl acrylate having a number average molecular weight of about 250,000. A finished leather having good flexibility and a non-tacky surface is obtained.

Example 5

Twenty parts of the solution obtained in Example 4(a) are added to 70 parts of a solution containing 7 parts of the vinyl copolymer described in Example 1 in 35 parts of methyl ethyl ketone, 45 parts of xylene, and 13 parts of ethoxyethyl acetate and the mixture is placed in a pressure container of a spray gun system. In a similar but separate container, 90 parts of the solution of Example 1(b) is mixed with 20 parts of the pigment suspension of Example 1(a). Hose leads from these two containers are brought by means of a Y-connection to a common discharge pipe of a conventional spray gun. The flow from each container is adjusted by means of valves in each line preceding the Y-connection so that about the same weight of material is sprayed from each container. The leather is treated in all other respects as in Example 1(c) and (d) and similar results are obtained.

Example 6

A solution is made in 69.5 parts of methyl ethyl ketone and 15 parts of toluene-2,4-diisocyanate and 15.5 parts of the plasticizer of Example 1. Twenty parts of this solution are mixed with 70 parts of a solution of 7 parts of the same vinyl copolymer as that of Example 1 in 35 parts of methyl ethyl ketone, 45 parts of xylene, and 13 parts of ethoxyethyl acetate. The resulting mixture is introduced into one of the pressured supply chambers of the spray gun system of Example 5. In the other supply chamber, there is provided a mixture of 90 parts of the solution of Example 1(b) and 20 parts of the pigment suspension of Example 1(a). The leather is sprayed while controlling the feed from each of the supply chambers to approximately equal amounts. After drying at 50° C., finishing of the leather is carried out in the same way as in Example 1(d). The finished leather had good adhesion between the coatings and the leather and its surface was dry and non-tacky.

Example 7

(a) A solution is prepared consisting of 6.5 parts of the vinyl copolymer of Example 1(a), 60 parts of methyl ethyl ketone, 13 parts of ethoxyethyl acetate and 21.5 parts of a hydrocarbon solvent such as xylene. While this solution is stirred, 0.3 part of phenyl isocyanate is added and the mixture temperature is brought to 50° C. This temperature and stirring are maintained for an additional 15 to 20 hours after which the mixture is allowed to cool. An inert atmosphere of nitrogen is kept over the system throughout the reaction.

(b) Seventy parts of the vinyl copolymer solution prepared in part (a) hereof are mixed with 20 parts of the plasticizer solution obtained in Example 4(a) and 10 parts of the pigment suspension described in Example 1(a). The procedure of Example 1(c) and (d) was followed in all other respects and the coated leather was similar.

Example 8

Seventy parts of the vinyl copolymer solution prepared in part (a) of Example 7 are mixed with 20 parts of the plasticizer solution obtained in Example 4(a) and the mixture is placed in a pressure container of a spray gun system. In a similar but separate container, 90 parts of the solution of Example 1(b) is mixed with 20 parts of the pigment suspension of Example 1(a). Hose leads from these two containers are brought by means of a Y-connection to a common discharge pipe of a conventional spray gun. The flow from each container is adjusted by means of valves in each line preceding the Y-connection so that about the same weight of material is sprayed from each container. The leather is treated in all other respects as in Example 1(c) and (d) and similar results are obtained.

Example 9

A solution consisting of 10 parts of toluene-2,4-diisocyanate and 90 parts of methyl ethyl ketone is swabbed on full-grain leather. The leather is allowed to air dry for 30 minutes. This is then treated in the same manner and with the same materials as described in Example 1(a) to (d) inclusive except that the toluene-2,4-diisocyanate is omitted from the solution in part (a) thereof and is replaced with 3 parts of methyl ethyl ketone. The results are similar to those obtained in Example 1, except the surface was slightly less slippery than that of the finished leather obtained in Example 1.

Example 10

Leather is treated as in Example 1 except that the 3 parts of toluene-2,4-diisocyanate are omitted from the solution of part (a) thereof and replaced by 3 parts of methyl ethyl ketone. After drying the finish, a solution of 10 parts of toluene-2,4-diisocyanate in 90 parts of methyl ethyl ketone is sprayed over it. This is allowed to dry at 50° C. The leather was similar in properties to that of Example 1.

Example 11

A solution is formed from 3.1 parts of the plasticizer of Example 1, 5.0 parts of the vinyl copolymer of Example 1 and 3 parts of toluene-2,4-diisocyanate in 10 parts of ethoxyethyl acetate, 44 parts of methyl ethyl ketone and 34.9 parts of a hydrocarbon solvent largely consisting of xylol. This solution is applied to a full-grain upholstery leather and dried at 50° C. for about three hours. Ninety parts of this same solution with the 3 parts of toluene-2,4-diisocyanate replaced with methyl ethyl ketone is mixed with 10 parts of the pigment dispersion described in Example 1(b) and the mixture is sprayed on top of the dried first coat and dried further for about 3 hours at 50° C. The clear coating described in Example 1(d) is sprayed over the previous coating and dried at 50° C. The results obtained are similar to those of Example 1(d) and (e) except the finish is slightly less slippery.

*Example 12*

Seventy parts of the vinyl copolymer solution prepared in Example 7(a) are mixed with 20 parts of the plasticizer solution obtained in Example 4(a). The resulting solution is applied as the first coat in the procedure of Example 11 which procedure is then followed. The leather obtained is similar to that obtained in Example 11.

*Example 13*

Pieces of buffed upholstery leather are swabbed with an aqueous dispersion containing 20% by weight of emulsion-polymerized ethyl acrylate and 14% of titanium dioxide, and dried at 50° C. On this base coat, two additional coats are applied by following the procedure of Example 1(a) through (d).

The adhesion between the coating and the leather was excellent and the product had a dry, slick surface which was resistant to blocking (against itself) at a temperature of 80° C. and a pressure of one pound per square inch.

*Example 14*

A buffed leather is treated with the aqueous ethyl acrylate polymer dispersion of Example 13 and is then further treated by the procedure described in Example 4(b). The finished leather obtained is similar to those obtained in Example 13.

It is to be understood that changes and variations may be made without departing from the spirit and scope of the invention as defined in the appended claims.

I claim:

1. A method of producing a coated leather comprising applying to the surface of a leather a dispersion having 2 to 20% solids concentration in an organic solvent and containing a film-forming addition polymer formed exclusively of at least one monomer selected from the group consisting of vinyl chloride, vinyl acetate, vinyl propionate, vinylidene chloride, acrylonitrile, methacrylonitrile, and alkyl esters of an acid selected from the group consisting of acrylic and methacrylic acids, from 20 to 100 parts per 100 parts of the polymer, of a polymeric plasticizer for the polymer selected from the group consisting of polyester condensates of a dicarboxylic acid and a polyhydric aliphatic alcohol having 2 to 12 carbon atoms, 5 to 100 parts of a pigment per 100 parts of the polymer and from 1 to 65% by weight of an organic polyisocyanate based on the sum of the weights of the plasticizer and addition polymer, said polyisocyanate being selected from the group consisting of alphatic and aromatic hydrocarbon diisocyanates and triisocyanates, and aromatic hydrocarbon diisocyanates substituted on the aromatic ring by alkoxy groups, drying the coated leather while reacting only a portion of the isocyanate groups, and, then, within 24 hours of the application of the aforesaid dispersion and before the isocyanate groups have been completely reacted, applying as the final coat on the coated leather a composition consisting essentially of an organic solvent in which there is dissolved (1) a film-forming addition polymer formed exclusively of at least one monomer selected from the group consisting of vinyl chloride, vinyl acetate, vinyl propionate, vinylidene chloride, acrylonitrile, methacrylonitrile, and alkyl esters of an acid selected from the group consisting of acrylic and methacrylic acids, and (2) a polymeric plasticizer for the polymer selected from the group consisting of polyester condensates of a dicarboxylic acid and a polyhydric aliphatic alcohol having 2 to 12 carbon atoms, the proportion of plasticizer being from 15 to 80 parts per 100 parts of the addition polymer in said composition, at least one of the polymer and plasticizer in the aforesaid dispersion and in the aforesaid composition containing groups having a reactive hydrogen atom selected from the group consisting of hydroxyl, mercapto, carboxyl, amino, and amide groups, and thereby being reactive toward isocyanate groups, and then drying the coated leather at a temperature at least as high as normal room temperature to simultaneously effect reaction of the partially reacted polyisocyanate with one of the polymeric components of the final coat.

2. A method according to claim 1 in which the leather is a full-grain leather.

3. A method as defined in claim 2 in which the same film-forming polymer and the same plasticizer are used in the dispersion and in the composition for applying the final coat.

4. A method as defined in claim 3 in which the film-forming polymer is a copolymer of vinyl chloride with vinyl acetate, the plasticizer is a polyester of an aliphatic dibasic acid with a glycol, and the polyisocyanate comprises toluene-2,4-diisocyanate.

5. A method of producing a coated leather comprising reacting in an organic solvent (A) a member of the group consisting of (1) a film-forming addition polymer formed exclusively of at least one monomer selected from the group consisting of vinyl chloride, vinyl acetate, vinyl propionate, vinylidene chloride, acrylonitrile, methacrylonitrile, and alkyl esters of an acid selected from the group consisting of acrylic and methacrylic acids and (2) a polymeric plasticizer selected from the group consisting of polyester condensates of a dicarboxylic acid and a polyhydric aliphatic alcohol having 2 to 12 carbon atoms, said member containing reactive groups selected from hydroxyl, mercapto, carboxyl, and amino and amide groups containing at least one reactive hydrogen atom on the nitrogen on such groups, with (B) an amount of a polyisocyanate more than that equivalent to the reactive groups of the member so that at least a portion of the isocyanate groups remain unreacted, said polyisocyanate being selected from the group consisting of aliphatic and aromatic hydrocarbon diisocyanates and triisocyanates, and aromatic hydrocarbon diisocyanates substituted on the aromatic ring by alkoxy groups, adding the resulting solution to a solution in an organic solvent of a film-forming addition polymer formed exclusively of at least one monomer selected from the group consisting of vinyl chloride, vinyl acetate, vinyl propionate, vinylidene chloride, acrylonitrile, methacrylonitrile, and alkyl esters of an acid selected from the group consisting of acrylic and methacrylic acids containing a dispersed pigment to form a dispersion comprising per 100 parts of addition polymer, 20 to 100 parts by weight of the aforesaid plasticizer, and 5 to 100 parts of pigment, said dispersion also comprising 1 to 65 parts of a polyisocyanate selected from the aforesaid group thereof in reacted form per 100 parts of the total of addition polymer and plasticizer, applying said dispersion to a leather, and drying the coated leather at a temperature of at least about 20° C. while reacting only a portion of the isocyanate groups, then, within 24 hours of the application of the aforesaid dispersion and before the isocyanate groups have been completely reacted, applying as a final coat on the coated leather a composition consisting essentially of an organic solvent in which there is dissolved (1) a film-forming addition polymer formed exclusively of at least one monomer selected from the group consisting of vinyl chloride, vinyl acetate, vinyl propionate, vinylidene chloride, acrylonitrile, methacrylonitrile, and alkyl esters of an acid selected from the group consisting of acrylic and methacrylic acids, and (2) 15 to 80 parts, per 100 parts of the addition polymer therein, of a polymeric plasticizer therefor selected from the group consisting of polyester condensates of a dicarboxylic acid and a polyhydric aliphatic alcohol having 2 to 12 carbon atoms, and then drying the coated leather at a temperature at least as high as normal room temperature to simultaneously effect reaction of the partially reacted polyisocyanate with one of the polymeric components of the final coat.

6. A method as defined in claim 5 in which the polyisocyanate comprises 3,3′-dimethyl-4,4′-diisocyanato-biphenyl.

7. A method as defined in claim 5 in which the polyisocyanate comprises 3,3′-dimethoxy-4,4′-diisocyanato-biphenyl.

8. A method as defined in claim 5 in which the film-forming polymer is a copolymer of vinyl chloride with vinyl acetate and the plasticizer is a polyester of an aliphatic dibasic acid with a glycol, and the polyisocyanate comprises toluene-2,4-diisocyanate.

9. A method as defined in claim 5 in which one of the members consisting of the film-forming addition polymer and the polymeric plasticizer other than that reacted with the polyisocyanate is reacted initially with about an equivalent amount of an organic monoisocyanate selected from the group consisting of phenyl isocyanate, toluene monoisocyanate, ethyl isocyanate, hexyl isocyanate, and naphthyl isocyanate, prior to the mixing of the polyisocyanate therewith.

10. A method of producing a coated leather comprising making a solution in an organic solvent of a polyisocyanate selected from the group consisting of aliphatic and aromatic hydrocarbon diisocyanates and triisocyanates, and aromatic hydrocarbon diisocyanates substituted on the aromatic ring by alkoxy groups, dispersing a pigment in an organic solvent solution of a film-forming polymer formed exclusively of at least one monomer selected from the group consisting of vinyl chloride, vinyl acetate, vinyl propionate, vinylidene chloride, acrylonitrile, methacrylonitrile, and alkyl esters of an acid selected from the group consisting of acrylic and methacrylic acids and a plasticizer therefor selected from the group consisting of polyester condensates of a dicarboxylic acid and a polyhydric aliphatic alcohol having 2 to 12 carbon atoms, at least one of the polymer and plasticizer containing groups having a reactive hydrogen atom selected from the group consisting of hydroxyl, mercapto, carboxyl, amino, and amide groups and thereby being reactive toward isocyanate groups, spraying leather with these solutions in separate streams to a common point of mixing in proximity to the point of spray formation in a spraying device, drying the coated leather at a temperature of at least normal room temperature of about 20° C. while reacting only a portion of the isocyanate groups, then, within 24 hours of the application of these solutions and before the isocyanate groups have been completely reacted, applying as a final coat on the leather a composition consisting essentially of an organic solvent in which there is dissolved (1) a film-forming addition polymer formed exclusively of at least one monomer selected from the group consisting of vinyl chloride, vinyl acetate, vinyl propionate, vinylidene chloride, acrylonitrile, methacrylonitrile, and alkyl esters of an acid selected from the group consisting of acrylic and methacrylic acids, and (2) 20 to 80 parts, per 100 parts of the addition polymer therein, of a polymeric plasticizer therefor selected from the group consisting of polyester condensates of a dicarboxylic acid and a polyhydric aliphatic alcohol having 2 to 12 carbon atoms, at least one of the polymer and plasticizer containing groups having a reactive hydrogen atom selected from the group consisting of hydroxyl, mercapto, carboxyl, amino, and amide groups and thereby being reactive toward isocyanate groups, and then drying the coated leather at a temperature at least as high as normal room temperature to simultaneously effect reaction of the partially reacted polyisocyanate with one of the polymeric components of the final coat.

11. A method of producing a coated leather comprising applying to the surface of a leather a dispersion having 2 to 20% solids concentration in an organic solvent and containing a copolymer of vinyl chloride with vinyl acetate, from 20 to 100 parts, per 100 parts of the copolymer, of a polymeric polyester of a dicarboxylic acid and a polyhydric aliphatic alcohol having 2 to 12 carbon atoms, from 5 to 100 parts by weight of pigmentary material per 100 parts of the copolymer, and from 1 to 65% by weight, on the weight of copolymer, of 3,3′-dimethoxy-4,4′-diisocyanato-biphenyl, drying the coated leather while reacting only a portion of the isocyanate groups, then, within 24 hours of the application of the aforesaid dispersion and before the isocyanate groups have been completely reacted, applying as the final coat on the leather a composition containing, dissolved in an organic solvent, a copolymer of vinyl chloride with vinyl acetate, and a polymeric polyester of an aliphatic dibasic acid with a glycol, the proportion of polyester being from 15 to 80 parts per 100 parts of the copolymer in said composition, and then drying the coated leather at a temperature at least as high as normal room temperature to simultaneously effect reaction of the partially reacted polyisocyanate with a polymeric component of the final coat.

12. A composition adapted to form a coating having good adhesion to leather comprising a dispersion in an organic solvent containing 2 to 20% by weight of a mixture of (1) a film-forming addition polymer formed exclusively of at least one monomer selected from the group consisting of vinyl chloride, vinyl acetate, vinyl propionate, vinylidene chloride, acrylonitrile, methacrylonitrile, and alkyl esters of an acid selected from the group consisting of acrylic and methacrylic acids, and (2) 20 to 100 parts, per 100 parts of the film-forming polymer, of a polymeric plasticizer selected from the group consisting of polyester condensates of a dicarboxylic acid and a polyhydric aliphatic alcohol having 2 to 12 carbon atoms, at least one of the polymer and plasticizer containing groups having a reactive hydrogen atom selected from the group consisting of hydroxyl, mercapto, carboxyl, amino, and amide groups and thereby being reactive toward isocyanate groups, and (3) from 1 to 65% by weight, based on the sum of the weights of the plasticizer and film-forming polymer, of an organic polyisocyanate selected from the group consisting of aliphatic and aromatic hydrocarbon diisocyanates and triisocyanates, and aromatic hydrocarbon diisocyanates substituted on the aromatic ring by alkoxy groups, at least one of said polymeric materials being combined chemically with an organic monoisocyanate selected from the group consisting of phenyl isocyanate, toluene monoisocyanate, ethyl isocyanate, hexyl isocyanate, and naphthyl isocyanate.

13. A composition adapted to form a coating having good adhesion to leather comprising a dispersion in an organic solvent containing 2 to 20% by weight of a mixture of (1) a film-forming addition polymer formed exclusively of at least one monomer selected from the group consisting of vinyl chloride, vinyl acetate, vinyl propionate, vinylidene chloride, acrylonitrile, methacrylonitrile, and alkyl esters of an acid selected from the group consisting of acrylic and methacrylic acids, (2) 20 to 100 parts, per 100 parts of the film-forming polymer, of a polymeric plasticizer selected from the group consisting of polyester condensates of a dicarboxylic acid and a polyhydric aliphatic alcohol having 2 to 12 carbon atoms, at least one of the polymer and plasticizer containing groups having a reactive hydrogen atom selected from the group consisting of hydroxyl, mercapto, carboxyl, amino, and amide groups and thereby being reactive toward isocyanate groups; (3) 5 to 100 parts, per 100 parts of the film-forming polymer, of a pigment, and (4) from 1 to 65% by weight, based on the sum of the weights of the plasticizer and film-forming polymer, of an organic polyisocyanate selected from the group consisting of aliphatic and aromatic hydrocarbon diisocyanates and triisocyanates, and aromatic hydrocarbon diisocyanates substituted on the aromatic ring by alkoxy groups, at least one of said polymeric materials being combined chemically with an organic monoisocyanate selected from the group consisting of phenyl isocyanate, toluene monoisocyanate, ethyl isocyanate, hexy isocyanate, and naphthyl isocyanate.

14. A coated leather having good softness and flexibility, good adhension between the coating and the leather, and a substantially dry and slick surface, said coated leather comprising a leather base having a composite multi-layer coating thereon obtained by the process of claim 1.

References Cited in the file of this patent

UNITED STATES PATENTS

| | | |
|---|---|---|
| 2,204,520 | Walker et al. | June 11, 1940 |
| 2,430,479 | Pratt et al. | Nov. 11, 1947 |
| 2,503,209 | Nyquist et al. | Apr. 4, 1950 |
| 2,537,064 | Kropa et al. | Jan. 9, 1951 |
| 2,555,062 | Small et al. | May 29, 1951 |
| 2,606,892 | Kropa et al. | Apr. 12, 1952 |
| 2,647,884 | Wystarch | Aug. 4, 1953 |
| 2,741,566 | Demme | Apr. 10, 1956 |
| 2,763,577 | Lawler | Sept. 18, 1956 |

FOREIGN PATENTS

| | | |
|---|---|---|
| 161,741 | Australia | Mar. 7, 1955 |